(12) United States Patent
Frassinelli et al.

(10) Patent No.: US 9,032,620 B2
(45) Date of Patent: May 19, 2015

(54) METHOD FOR MOVING AND ALIGNING HEAVY DEVICE

(75) Inventors: Luca Frassinelli, Florence (IT); Stefano Rossin, Pistoia (IT); Daniela Meiattini, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 814 days.

(21) Appl. No.: 12/608,663

(22) Filed: Oct. 29, 2009

(65) Prior Publication Data

US 2010/0150693 A1 Jun. 17, 2010

Related U.S. Application Data

(60) Provisional application No. 61/122,106, filed on Dec. 12, 2008.

(51) Int. Cl.
| | |
|---|---|
| *B23P 11/00* | (2006.01) |
| *B66F 19/00* | (2006.01) |
| *F01D 25/28* | (2006.01) |
| *B23P 21/00* | (2006.01) |
| *B62D 65/02* | (2006.01) |

(52) U.S. Cl.
CPC ............... *B66F 19/00* (2013.01); *B23P 21/00* (2013.01); *B62D 65/022* (2013.01); *F01D 25/28* (2013.01); *Y02T 50/671* (2013.01)

(58) Field of Classification Search
CPC ........ B23P 19/04; B23P 21/00; B23P 21/004; B23P 2700/50; B62D 65/022; B62D 65/18
USPC ............... 29/889.1, 426.1, 426.3, 426.5, 429, 29/430; 414/266, 267
See application file for complete search history.

(56) References Cited

U.S. PATENT DOCUMENTS

| | | | |
|---|---|---|---|
| 4,044,442 | A | 8/1977 | Carlson |
| 4,850,091 | A | 7/1989 | Stadelmann |
| 4,885,838 | A | 12/1989 | Ruecker et al. |

(Continued)

FOREIGN PATENT DOCUMENTS

| | | |
|---|---|---|
| CH | 292539 A | 8/1953 |
| CN | 1915784 A | 2/2007 |

(Continued)

OTHER PUBLICATIONS

Office Action from corresponding Chinese Application No. 200910262610.8, dated May 21, 2013.

(Continued)

*Primary Examiner* — Christopher Besler
(74) *Attorney, Agent, or Firm* — GE Global Patent Operation

(57) ABSTRACT

Method for laterally replacing a heavy component of a plant assembly, the method including disconnecting the heavy component from other components of the plant assembly and from a base plate to which the heavy component is fixed; lifting the heavy component above the base plate with a lifting system provided within the base plate; connecting at least a pair of rails to the base plate, under the lifted heavy component, such that the at least a pair of rails extends at substantially a right angle relative to a longitudinal axis of the heavy component; lowering the heavy component on crawling mechanisms disposed on the at least a pair of rails; and laterally replacing the heavy component from the base plate and the other components of the plant assembly by actuating the crawling mechanisms.

6 Claims, 14 Drawing Sheets

(56) References Cited

U.S. PATENT DOCUMENTS

| | | | |
|---|---|---|---|
| 5,383,652 A | 1/1995 | Van Den Berg | |
| 5,675,881 A | 10/1997 | Stadelmann | |
| 5,916,260 A | 6/1999 | Dubar | |
| 6,109,424 A | 8/2000 | Doan | |
| 7,043,924 B2 | 5/2006 | Kuroki et al. | |
| 7,503,244 B2 | 3/2009 | Nakamura et al. | |
| 7,770,292 B2 | 8/2010 | Stretton | |
| 7,779,540 B2 | 8/2010 | McCaffrey et al. | |
| 7,827,686 B2 | 11/2010 | Burmeister et al. | |
| 7,874,058 B2 * | 1/2011 | Kodo et al. | 29/430 |
| 2003/0061819 A1 | 4/2003 | Kuroki et al. | |
| 2005/0257358 A1 * | 11/2005 | Giarrizzo | 29/402.08 |
| 2006/0272152 A1 * | 12/2006 | Burmeister et al. | 29/889.1 |
| 2007/0131839 A1 | 6/2007 | Dunn et al. | |
| 2008/0187431 A1 | 8/2008 | Brown et al. | |

FOREIGN PATENT DOCUMENTS

| | | | |
|---|---|---|---|
| CN | 101048312 A | 10/2007 | |
| CN | 200961369 Y | 10/2007 | |
| CN | 101105150 A | 1/2008 | |
| EP | 0246470 A1 | 11/1987 | |
| EP | 0690260 A1 | 1/1996 | |
| GB | 1125171 A | 8/1968 | |
| JP | 58151196 U | 10/1983 | |
| JP | S5957804 A | 4/1984 | |
| JP | H01137580 A | 5/1989 | |
| JP | H02182609 A | 7/1990 | |
| JP | 07136798 A | 5/1995 | |
| JP | H11193200 A | 7/1999 | |
| JP | 2000053400 A | 2/2000 | |
| JP | 2000513757 A | 10/2000 | |
| JP | 2001082106 A | 3/2001 | |
| JP | 2003106171 A | 4/2003 | |
| JP | 2005131768 A | 5/2005 | |
| SU | 1423352 A1 | 9/1988 | |
| SU | 1504171 A1 | 8/1989 | |
| SU | 1808094 A3 | 4/1993 | |
| WO | 2004097179 A1 | 11/2004 | |
| WO | 2006018242 A2 | 2/2006 | |
| WO | WO 2006046335 A1 * | 5/2006 | |

OTHER PUBLICATIONS

EP Partial Search Report dated Jul. 29, 2013 from corresponding EP Application No. 09177602.1.
Unofficial English translation of RU Office Action dated Oct. 22, 2013 from corresponding RU Application No. 2009147215.
EP Search Report and Written Opinion dated Dec. 20, 2013 from corresponding Application No. 09177602.1.
Unofficial English translation of CN Office Action dated Jan. 2, 2014 from corresponding Application No. 200910262610.8.
Unofficial English translation of a JP Office Action dated Mar. 4, 2014 issued in connection with corresponding JP Application No. 2009-275010.
Unofficial English Translation of Japanese Notice of Allowance issued in connection with corresponding JP Application No. 2009-275010 on Nov. 4, 2014.

* cited by examiner

METHOD FOR MOVING AND ALIGNING HEAVY DEVICE

RELATED APPLICATIONS

This application is related to, and claims priority from, U.S. Provisional Patent Application Ser. No. 61/122,106 filed on Dec. 12, 2008, entitled "Method for Moving and Aligning Heavy Device", the disclosure of which is incorporated here by reference.

BACKGROUND

1. Technical Field

Embodiments of the subject matter disclosed herein generally relate to methods and systems and, more particularly, to mechanisms and techniques for moving a heavy device and aligning it with other devices.

2. Discussion of the Background

During the past years, an increased interest in alternative sources of energy has driving the oil and gas industry in exploring fossil fuels off-shore, at higher depths. One such fossil source is liquefied natural gas (LNG). LNG is a gas that has been converted to liquid form for ease of storage or transport. Liquefied natural gas takes up about 1/600th the volume of natural gas at a stove burner tip. However, for the extraction and liquefaction process, the off-shore platform needs a consistent supply of energy. One way to achieve this energy is to provide the off-shore platform with a power generation source.

Conventionally, a power generation source includes a fuel supply source, a turbine, and a generator. FIG. 1 shows the turbine 10 connected to generator 20 and also to the fuel supply source 30. Burning the fuel from the fuel supply source 30, the turbine 10 generates rotation motion in the axis 12. The axis 12 is connected to an axis 22 of the generator 20. The two axes 12 and 22 are coupled together via a coupling element 14. The two axes 12 and 22 have to be well aligned in order to prevent damage to the coupling or of the axes. By rotating the axis 22 of the generator 20, the generator 20 generates the electric energy necessary for the off-shore platform. The weights of the turbine 10 and generator 20 are large, in the range of 100 to 250 tons.

Thus, when performing maintenance for these heavy devices, large and powerful cranes have to be available in order to remove, for example, the casing of the turbine for various maintenance operations. Such operations are not only dangerous but also time consuming. For example, a conventional maintenance process may take 45 days to be performed. In addition, the process is dangerous because heavy parts are hanging above the turbine and generator, with the potential of falling and destroying the equipment or injuring the persons beneath.

Further, as the power plant is off-shore, i.e., floating on a barge, the movement of the sea also contributes to the increase danger of having heavy devices hanging overhead. Furthermore, new designs of the turbines and generators require that other equipment associated with the power plant is provided in top of the turbine and generator, as shown for example in FIG. 2.

FIG. 2 shows such an example of a gas turbine 10 connected to a generator 20 and disposed on a base plate 40. The base plate 40 may have plural gimbals 45 that support the base plate 40. The gimbals 45 are supported by the barge 50. FIG. 2 shows how various equipment is disposed at level A, above the turbine 10 and the generator 20. Furthermore, FIG. 2 shows even more equipment disposed at a level B, in top of level A.

Accordingly, it would be desirable to provide systems and methods that avoid the afore-described problems and drawbacks, i.e., hanging heavy parts, providing powerful cranes, lack of access from above to the heavy devices, etc.

SUMMARY

According to one exemplary embodiment, there is a method for laterally replacing a heavy component of a plant assembly. The method includes disconnecting the heavy component from other components of the plant assembly and from a base plate to which the heavy component is fixed; lifting the heavy component above the base plate with a lifting system provided within the base plate; connecting at least a pair of rails to the base plate, under the lifted heavy component, such that the at least a pair of rails extends at substantially a right angle relative to a longitudinal axis of the heavy component; lowering the heavy component on crawling mechanisms disposed on the at least a pair of rails; and laterally replacing the heavy component from the base plate and the other components of the plant assembly by actuating the crawling mechanisms.

According to another exemplary embodiment, there is a method for laterally aligning a first heavy component with a second component on a base plate of a plant assembly, the first heavy component having a longitudinal axis extending along a longest size of the first heavy component and a lateral axis extending substantially perpendicular to the longitudinal axis such that both the longitudinal axis and the lateral axis are in a plane of the base plate. The method includes receiving the first heavy component on a lifting system provided within the base plate; lowering the first heavy component with the lifting system on the base plate such that guiding pins provided on a skid of the first heavy component enter guiding holes provided in the base plate; and pushing the skid of the first heavy component along the lateral axis with a lateral aligning system that includes at least two moving cylinders provided on a first side of the skid and configured to push the skid along the lateral axis, and at least two moving cylinders provided on a second side of the skid, opposite the first side, and configured to push the skid opposite to the at least two moving cylinders on the first side.

According to still another exemplary embodiment, there is a method for axially aligning a first heavy component with a second component on a base plate of a plant assembly, the first heavy component having a longitudinal axis extending along a longest size of the first heavy component and a lateral axis extending substantially perpendicular to the longitudinal axis such that both the longitudinal axis and the lateral axis are in a plane of the base plate. The method includes receiving the first heavy component on a lifting system provided within the base plate; lowering the first heavy component with the lifting system on the base plate such that a single guiding pin, connected to a skid of the first heavy component, enters a receiving guiding hole provided in the base plate, wherein the single guiding pin is a reference point of the skid; and applying, with an axial aligning system, a force to the single guiding pin along the longitudinal axis to move the skid along the longitudinal axis towards or away from the second component.

According to another exemplary embodiment, there is a turbine package configured to be connected to a heavy device in a plant assembly. The turbine package includes a turbine having a weight between 100 to 250 tons; a skid connected to the turbine and configured to support the turbine; at least four guiding pins connected to the skid, on a side of the skid opposite to a side to which the turbine is connected; and a single guiding pin centrally connected to the skid on the same side as the at least four guiding pins. The four guiding pins are connected to the skid closer to an external perimeter of the skid than to the single guiding pin.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a gas turbine connected to a generator to form a plant assembly on a barge. However, the embodiments to be discussed next are not limited to these systems, but may be applied to other plant assemblies that include heavy devices that require easy and safe access and also a good alignment among the various devices. The exemplary embodiments also apply to devices that are located on the ground.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
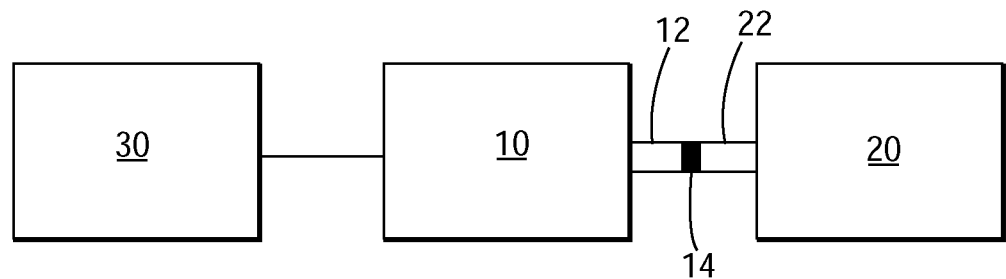
FIG. 1 is a schematic diagram of a turbine connected to a generator.
Figure 2:
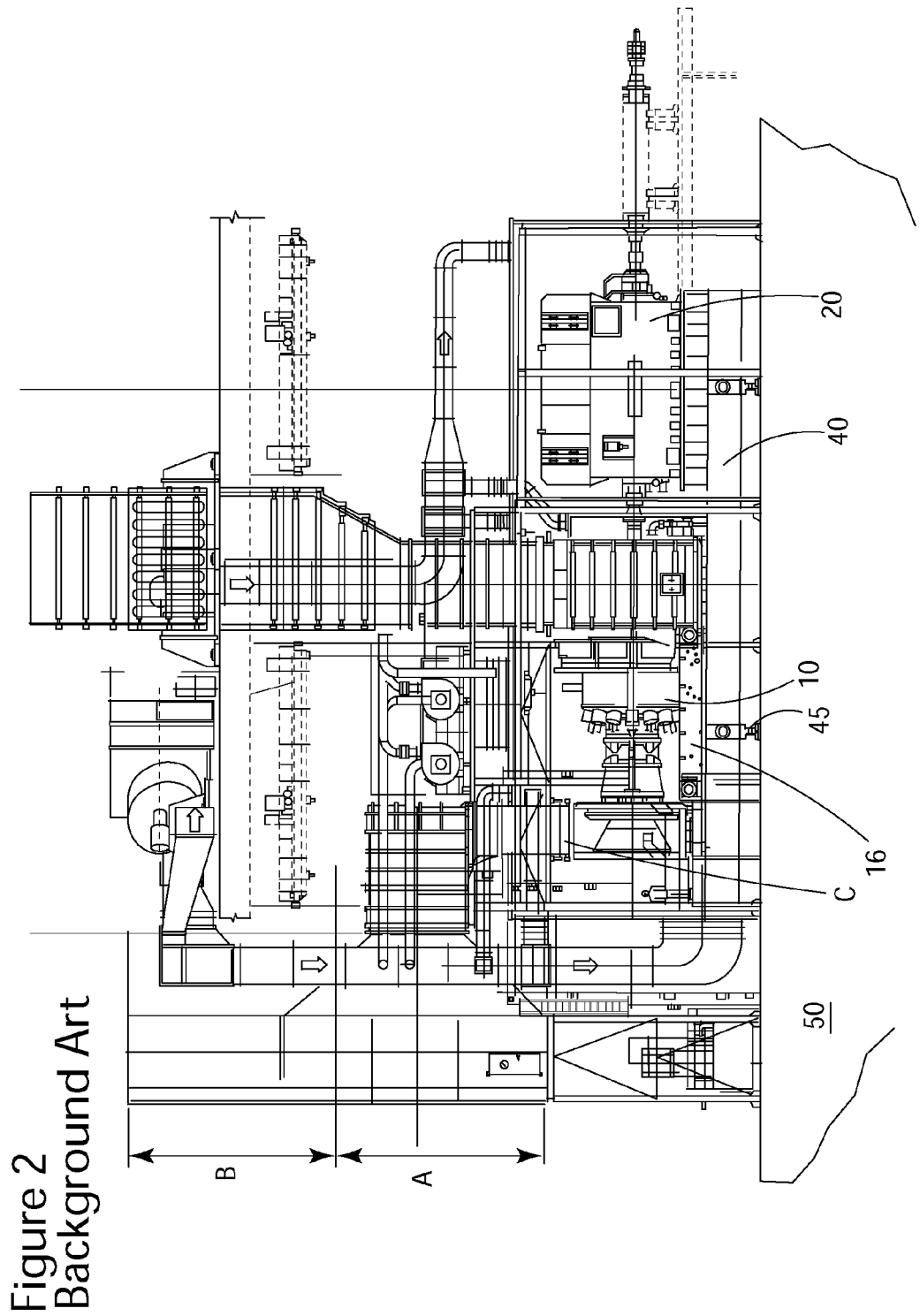
FIG. 2 is a schematic side view of a power plant disposed on a barge.
Figure 3:
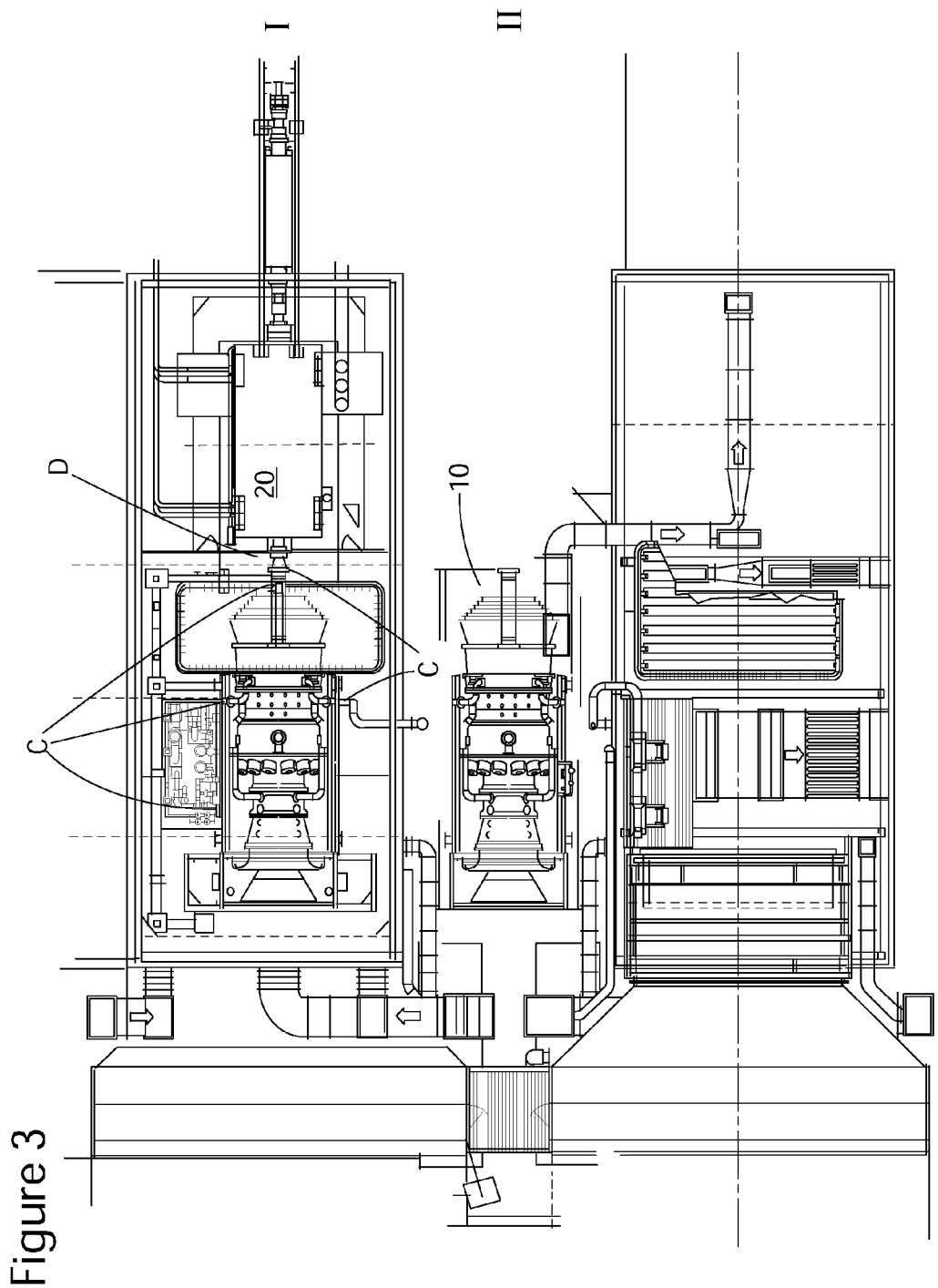
FIG. 3 is a schematic top view of a plant assembly disposed on a barge.

As discussed above with regard to FIG. 2, because of the existing equipment provided in top of the turbine 10 and generator 20, it is necessary to use a powerful crane to raise a skid 16 with all the equipment on it for maintenance. Thus, according to an exemplary embodiment shown in FIG. 3, the turbine 10 is laterally removed from its original place, i.e., removed at a side of the plant assembly. FIG. 3 shows various components of the plant assembly connected to the turbine 10 at points C. When the turbine 10 is taken from position I to position II, all those connections C are disconnected from the turbine 10. It is noted that connection D, between the turbine 10 and the generator 20 is directional sensitive in the sense that the axes of the turbine 10 and generator 20 would have to be aligned with a high precision to allow a smooth synchronous rotation of the axes. This aspect will be discussed later.

By laterally replacing the turbine 10 from the plant assembly, no heavy cranes are necessary and the danger of having the heavy turbine 10 falling on the equipment below and/or maintenance personnel is removed. However, other challenges have to be addressed when performing the lateral removal of the turbine 10. These aspects are discussed next.

Figure 4:
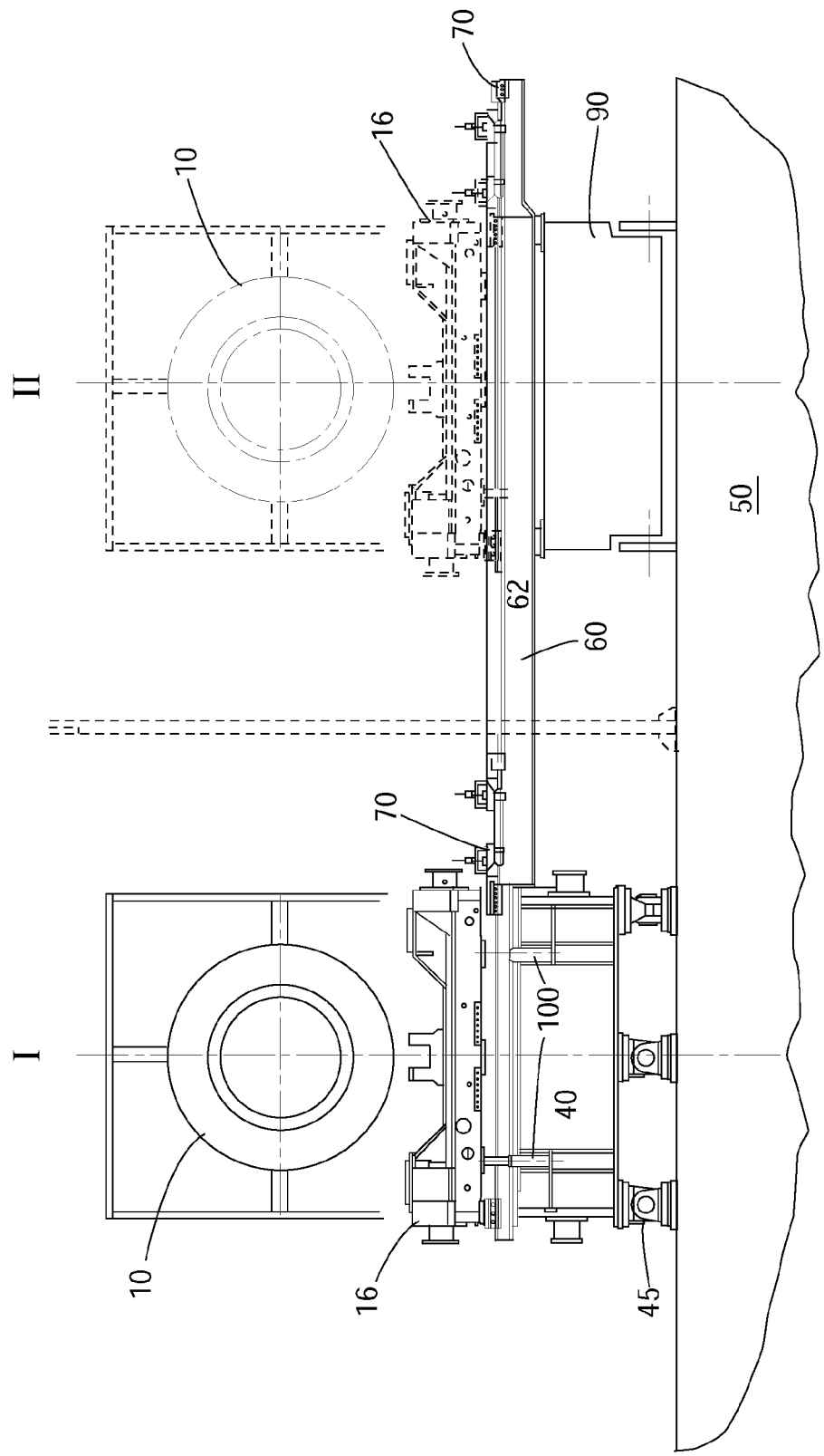
FIG. 4 is a schematic cross sectional view of a turbine on a base plate fixed to a barge according to an exemplary embodiment.

According to an exemplary embodiment, the turbine 10 is removed from its original position in the plant assembly by using a rail system 60 and crawling mechanisms 70 as shown in FIG. 4. The crawling mechanisms 70 may enter under the turbine skid 16 and the main baseplate 40 and move the turbine 10 together with the skid 16 from position I to position II along the railing system 60. The skid 16 may be a heavy metal structure on which the entire turbine 10 is fixed. At position II, a trolley 90 receives the skid 16 with the turbine 10. The rail system 60 may include two rails 62. Each rail may be made of steel and have a height of about 48 cm and a width of about 60 cm. The length of the rail is dictated by the size of the barge, the turbine unit, the space available around the plant assembly, etc. The trolley 90 may include a lifting system (not shown) for lifting the skid 16 and turbine 10 such that the two rails 62 may be removed.

Figure 5:
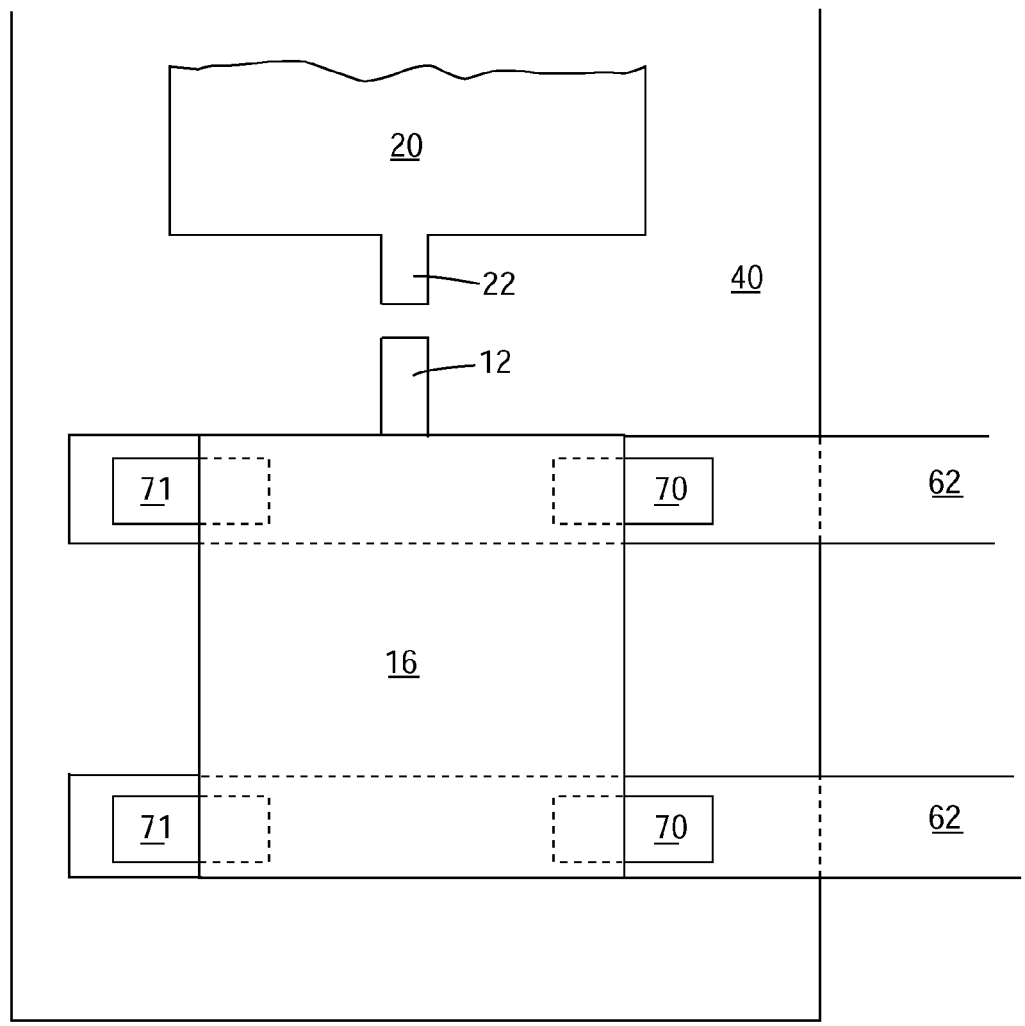
FIG. 5 is a schematic top view of a skid of a heavy device, a rail system and crawling mechanisms according to an exemplary embodiment.

FIG. 4 shows only one crawling mechanism 70 that enters under the turbine skid 16 from right to left at position I. The same crawling mechanism 70 is shown at the right of position II. However, according to an exemplary embodiment, two active crawling mechanisms 70 together with two passive driven pads (not shown in FIG. 4) are used to support the turbine skid 16. The active crawling mechanisms 70 and the two passive driven pads 71 may be provided as shown in FIG. 5, in which the two rails 62 are shown installed on the base plate 40, under the skid 16. The turbine 10 is not shown on skid 16 for simplicity. FIG. 5 also shows the two crawling mechanisms 70 and the two driven pads 71 and their position relative to the skid 16.

Still with regard to FIG. 4, after the turbine 10 and skid 16 are replaced from position I to position II with the crawling mechanisms 70, the rail system 60 may be removed and the skid 16 is attached to the trolley 90. The trolley 90 may be then taken either to another location of the barge, for example, a workshop, or to another barge to be taken to a ground location for maintenance.

Still with regard to FIG. 4, the gimbals 45 are connected to the base plate 40 to support the base plate 40. The gimbals 45 may be mounted on a deck, which may be a barge, or a solid foundation on the ground. It is noted that for the weight supported by the base plate 40 (100 to 250 tons for the turbine, 100 to 250 tons for the generator and another 100 to 250 tons for the remaining equipment), i.e. 300 to 750 tons, there is no known base plate being supported by only 3 gimbals. One advantage for having three and not less or more gimbals for such a system is the fact that each of the three gimbals contacts the deck while for four or more gimbals is not possible to have a complete contact between each gimbals and the supporting deck. Having a stable base plate for such a heavy device is advantageous.

Figure 6:
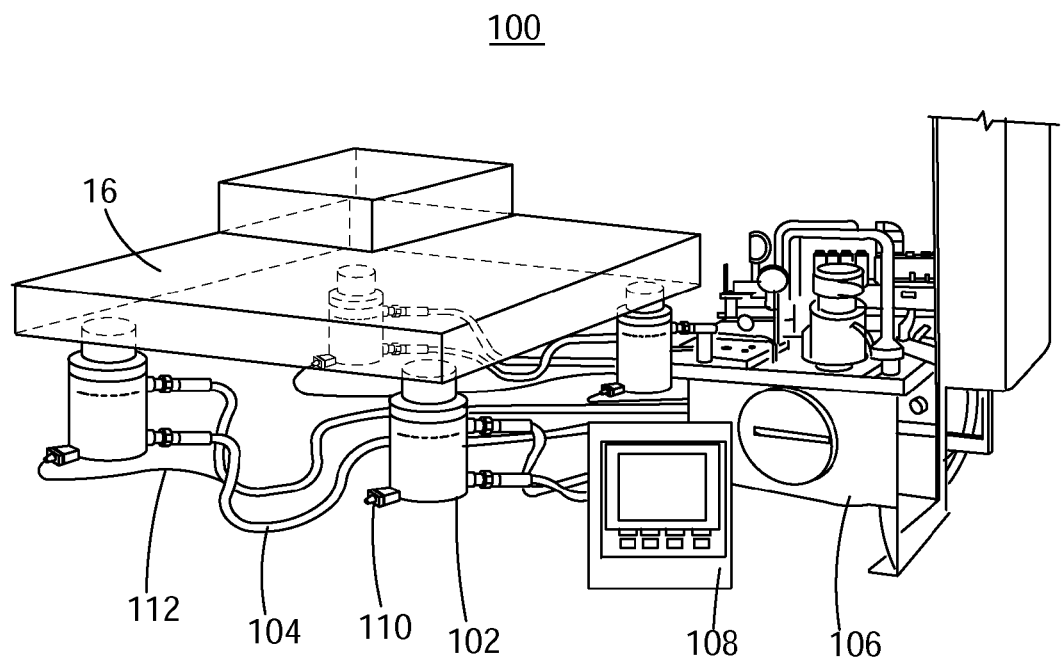
FIG. 6 is a schematic overall view of a lifting system according to an exemplary embodiment.

For moving the turbine 10 from position I on the crawling mechanisms 70, a lifting system 100 as shown in FIG. 4 is utilized. FIG. 4 shows only two lifting jacks of the lifting system 100. However, more lifting jacks may be used as shown in FIG. 6. According to an exemplary embodiment, the lifting system 100 may include four lifting jacks 102 for lifting the skid 16. The lifting jacks 102 may be connected via hydraulic hoses 104 to a hydraulic pump 106. A control system 108, which may include a computer with a touch screen, keyboard, mouse, screen, etc. is connected to the hydraulic pump 106 and to stroke sensors 110 via cables 112. The control system 108 may be configured to control the lift applied by the lifting jacks 102. According to one exemplary embodiment, the control system 108 may be configured to control each lifting jack 102 independently, or some or all of the lifting jacks 102 simultaneously to produce a same or different amount of lift.

Figure 7:
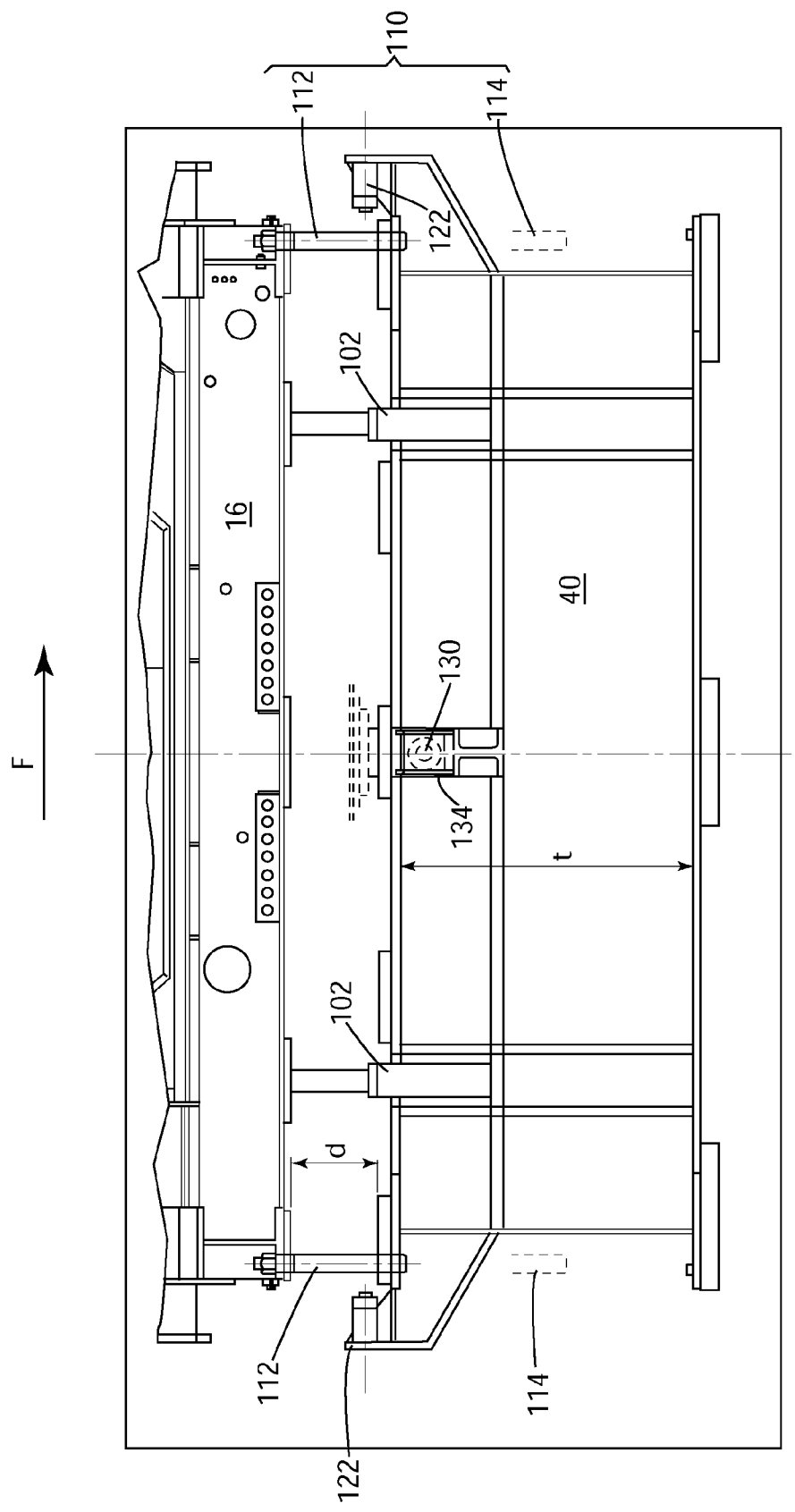
FIG. 7 is a schematic side view of the skid lifted from the base plate according to an exemplary embodiment.

The lifting system 100 may be provided within the base plate 40 as shown in FIG. 7. FIG. 7 shows one cross section of the skid 16 supported by two lifting jacks 102 such that the skid 16 and turbine 10 are raised a distance "d" from the base plate 40. The distance "d" may be between 20 and 60 cm. As shown in FIG. 7, according to an exemplary embodiment, the lifting system 100 may be permanently secured within the base plate 40. This is possible as a thickness "t" of the base plate may be between 1 to 2 m. However, according to this exemplary embodiment, the lifting jacks 102 may be replaced after the skid 16 and turbine 10 are laterally removed.

FIG. 7 also shows a guiding mechanism 110 that includes guiding pins 112 and guiding holes 114. The guiding pins 112 are steel pins connected to the skid 16 and are configured to enter the guiding holes 114 that are provided in the base plate 40. A diameter of the guiding holes 114 is larger than a diameter of the guiding pins 112 such that the guiding pins 112 may easily enter the guiding holes 114. The guiding mechanism 110 is used to guide the skid 16 and turbine 10 towards and away from the base plate 40. Also, the guiding mechanism 110 prevents the skid 16 and turbine 10 from falling off the base plate 40 when the barge is experiencing high waves. As previously discussed, the axis 12 of the turbine 10 needs to be aligned with the axis 22 of the generator 20 and thus, an initial, rough, alignment can be achieved by using the guiding mechanism 110 to have the turbine 10 in a desired position. However, due to the fact that the guiding pins 112 do not fit tightly the guiding holes 114 (it would be very difficult to deliver a heavy turbine with four pins to perfectly enter into four holes), even after the skid 16 and turbine 10 are lowered on the base plate 40 with the guiding pins 112 into the guiding holes 114, it may happen that the turbine 10 is not aligned with the generator 20. Various mechanisms that may be used to further align the turbine 10 with the generator 20 are discussed later.

Figure 8:
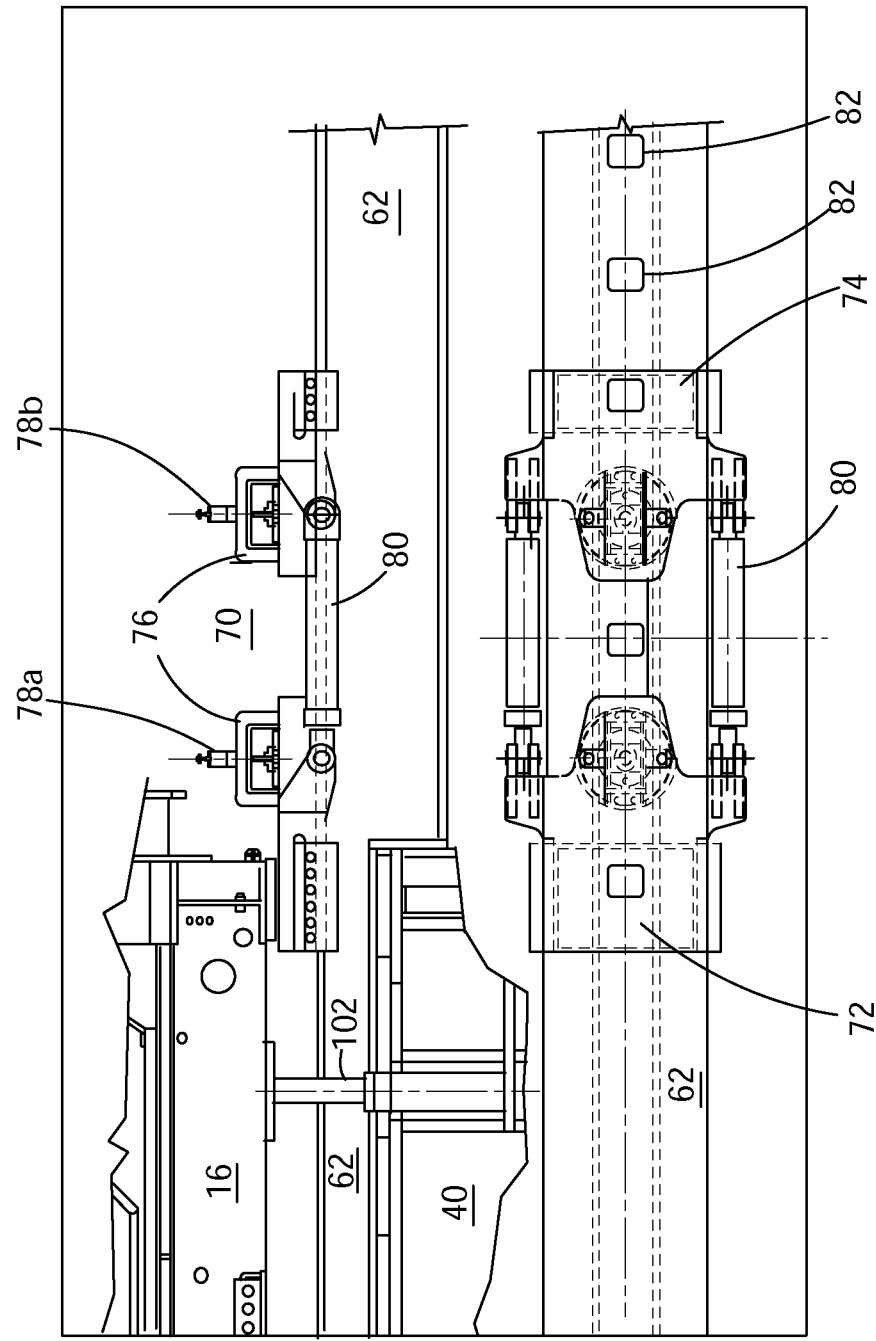
FIG. 8 is a schematic view of the crawling mechanism inserted under the skid according to an exemplary embodiment.

Once the skid 16 and turbine 10 are lifted from the base plate 40 (assuming that all the connections of the turbine to other devices are disconnected), the rail system 60 is installed as shown in FIG. 8. The upper drawing in FIG. 8 shows a side view of rail 62, crawling mechanism 70, base plate 40 and skid 16 while the lower drawing in FIG. 8 shows a top view of the rail 62 and the crawling mechanism 70. The lower drawing in FIG. 8 corresponds to the upper drawing of the same figure. Each rail 62 has one end fixed in two locations to the base plate 40 and the other end fixed to the trolley 90, for stability. The rail 62 is fixed to the base plate 40 at the same locations where the skid 16 is fixed to the base plate 40. Thus, the rail system 60 does not necessitate extra elements for being attached to the base plate 40.

Once the rail system 60 is fixed in place, the crawling mechanism is brought under the skid 16. The crawling mechanism 70 is discussed now in more details with regard to FIG. 8. The crawling mechanism 70 (two crawling mechanisms 70 are used to move the turbine skid 16 but only one is shown in FIG. 8) may include a load bearing pad 72, a no load pad 74, each connected to a corresponding sliding fixture 76. One crawling mechanism 70 may include two sliding fixtures 76 connected to each other by moving cylinders 80. The two sliding fixtures 76 may include corresponding engagement cylinders 78a and 78b. The rails 62 have holes 82 that have a shape and size matching the engagement cylinders 78a and 78b.

The movement of the crawling mechanism 70 is discussed next still with regard to FIG. 8. A similar crawling mechanism is used in the aeronautic industry for moving airplanes' bodies. Once the crawling mechanism 70 is in position, i.e., the load bearing pad 72 is under the skid 16 and the skid 16 is lowered on the two load bearing pads 72 of the two crawling mechanism 70 and on the driven pads 71, the moving cylinder 80 is actuated (expanded) to move engagement cylinder 78b to be aligned with a slot 82. Once the alignment of the engagement cylinder 78b and the slot 82 is achieved, the engagement cylinder 78b is lowered into the slot 82 to fix the engagement cylinder 78b and the corresponding sliding fixture 76. Assuming that the engagement cylinder 78a was already lowered into another slot 82, the engagement cylinder 78a is now raised to exit from slot 82. Then, the moving cylinder 80 is actuated (contracted) to move the engagement cylinder 78a towards the engagement cylinder 78b. At this stage, the skid 16 moves towards the engagement cylinder 78b, thus exiting the plant assembly.

Once the engagement cylinder 78a is aligned to another slot 82, the engagement cylinder 78a is lowered into this new slot 82, the engagement cylinder 78b is raised out of its slot 82, the moving cylinder 80 is again expanded to move the engagement cylinder 78b to another slot, further away from the skid 16. Then the process is repeated until the skid 16 and turbine 10 is completely and laterally removed from the plant assembly and the skid 16 is fully on the trolley 90.

The moving cylinder 80 may be one of those produced by Enerpac, Italy. For example, the moving cylinder 80 may be RAC-302, produced by Enerpac, which can develop a force of 30 tons at 700 bar. The pads 72 and 74 slide on the rail 62 with no wheels. The faces of the pads facing the rail 62 are, for example, coated in Teflon or Turcite™ to produce a low friction. A distance between the two engagement cylinders 78a and 78b may be between 50 and 200 cm.

Having the skid 16 and the turbine 10 above the trolley 90, a similar mechanism to the lifting system 100 may be used to lift the skid 16 from the rails 62, remove the rail system 60 and lower the skid 16 on the trolley 90. A reverse process may be used to install the skid 16 and turbine 10 back into the plant assembly.

However, installing the skid 16 with the turbine 10 back on the base plate 40 involves, as discussed earlier, aligning the axis 12 of the turbine 10 with the axis 22 of the generator 20. The alignment mechanism is discussed now with regard to the following exemplary embodiments and FIGS. 7 and 9.

Figure 9:
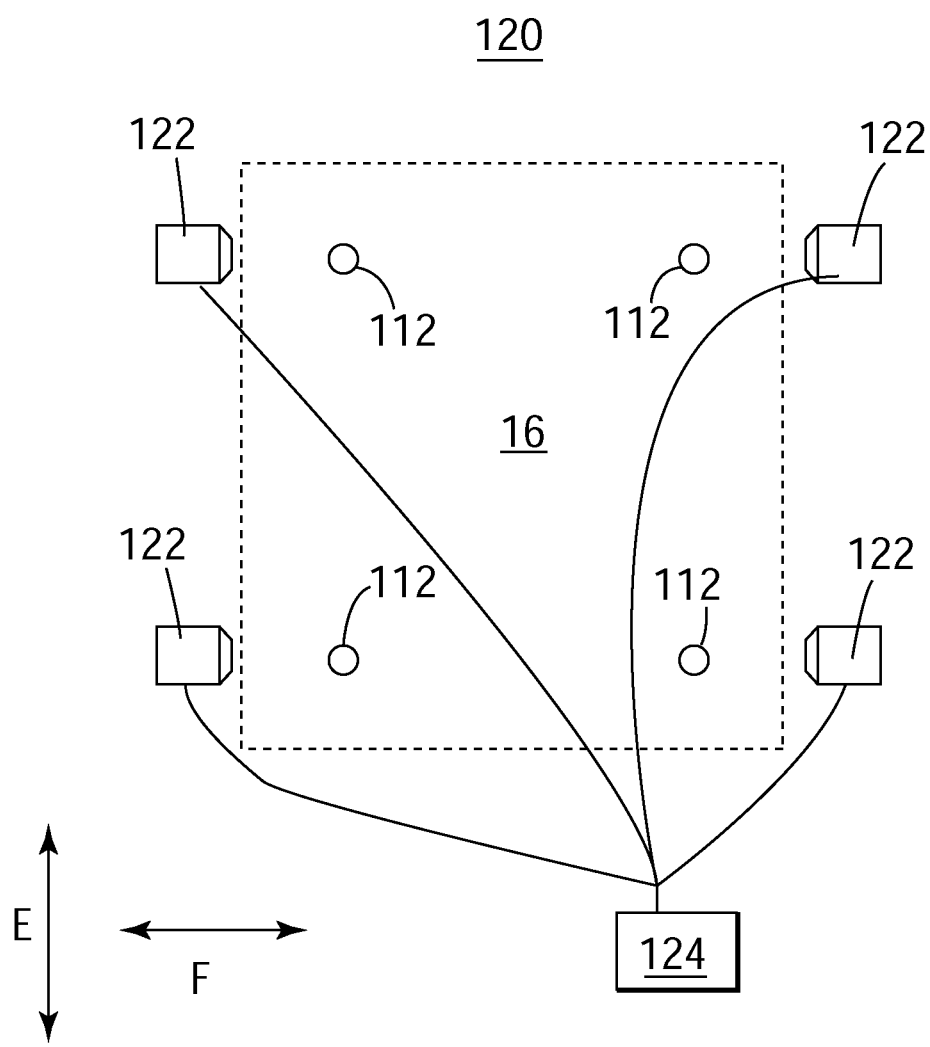
FIG. 9 is a schematic view of a lateral aligning mechanism according to an exemplary embodiment.

According to an exemplary embodiment, a lateral alignment is achieved as discussed next and illustrated in FIG. 7. FIG. 7 shows a cross section through the skid 16 and the base plate 40. Turbine 10 and skid 16 extend into and out of the page. As discussed earlier, after the guiding pins 112 are lowered into the guiding holes 114 (assuming that the skid 16 has been transferred from the rail system 60 onto the lifting system 100 of the base plate 40), the lifting jacks 102 are completely retracted into the base plate 40 such that the lifting jacks 102 are not in contact with the skid 16. Suppose that skid 16 has to be moved now in a lateral direction, indicated by arrow F in FIG. 7. A lateral aligning system 120, which is shown in FIG. 9, may include four displacing cylinders 122, two on each side of the skid 16. By actuating pairs of the displacing cylinders 122, which are controlled by a controlling device 124, the skid 16 may be laterally displaced along direction F. An exemplary location of the guiding pins 112 are shown on the skid 16 in reference to the displacing cylinders 122. Other locations of the guiding pins 112 and displacing cylinders 122 are also possible as will be appreciated by those skilled in the art.

Figure 10:
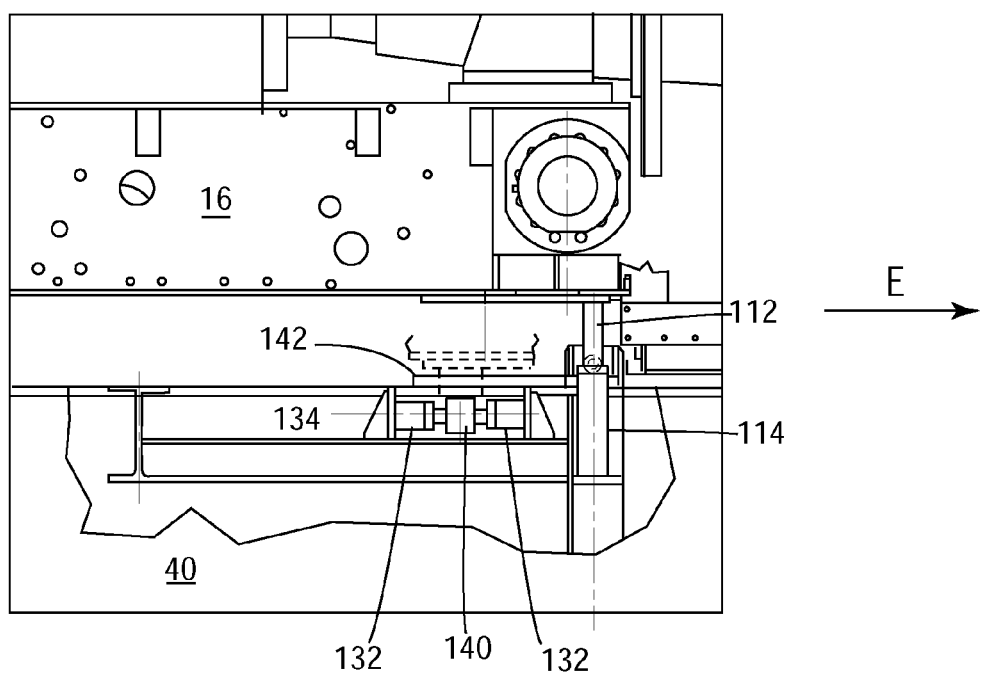
FIG. 10 is a schematic view of an axial aligning mechanism according to an exemplary embodiment.

According to another exemplary embodiment, an axial alignment of the turbine 10 and the generator 20 is discussed with regard to FIGS. 7 and 10. FIG. 7 shows an axial alignment system 130, which is configured to receive a single pin 140 (shown in FIG. 10) that is part of the skid 16 or attached to the skid 16. According to an exemplary embodiment, the single pin 140 is fixedly attached to the skid 16. A cross section of the single pin 140 may be, in one application, square or rectangular. After the single pin 140 is inserted into a guiding square plate 142, which is welded to the base plate 40, and after the turbine 10 has been aligned both axially and laterally, the single pin 140 is fixed relative to the base plate 40 by using shims (not shown). In this way, the turbine is fixedly attached to the base plate 40. When the skid 16 has to be removed from the base plate 40, the single pin 140 disengages from the guiding square plate 142.

The axial alignment system 130 includes at least two axial moving cylinders 132, placed in a cavity 134 formed in the base plate 40. A distance between the ends of the axial moving cylinders 132 is larger than a size of the single pin 140 such that the single pin 140 may enter between the two axial moving cylinders 132, as shown in FIG. 10.

The axial moving cylinders 132 are configured to move along an axial direction E, which is perpendicular to F. Both directions E and F are in the plane of the base plate 40. By actuating one of the axial moving cylinders 132, the skid 16 and turbine 10 are moved along the E direction and by actuating the other axial moving cylinder 132, the skid 16 and turbine 10 are moving in the opposite direction. With this axial movement, the axis 12 of the turbine 10 may be moved closer or farther from the axis 22 of the generator 20 and this axial movement of the turbine 10 was designed to be able to achieve the coupling or decoupling of the two axes 12 and 22 via the coupling element 14.

According to an exemplary embodiment, the lateral alignment and the axial alignment may be performed independently one from the other. The moving cylinders of Enerpac may be used in the lifting system 100, the lateral alignment system 120 and the axial alignment system 130.

Figure 11:
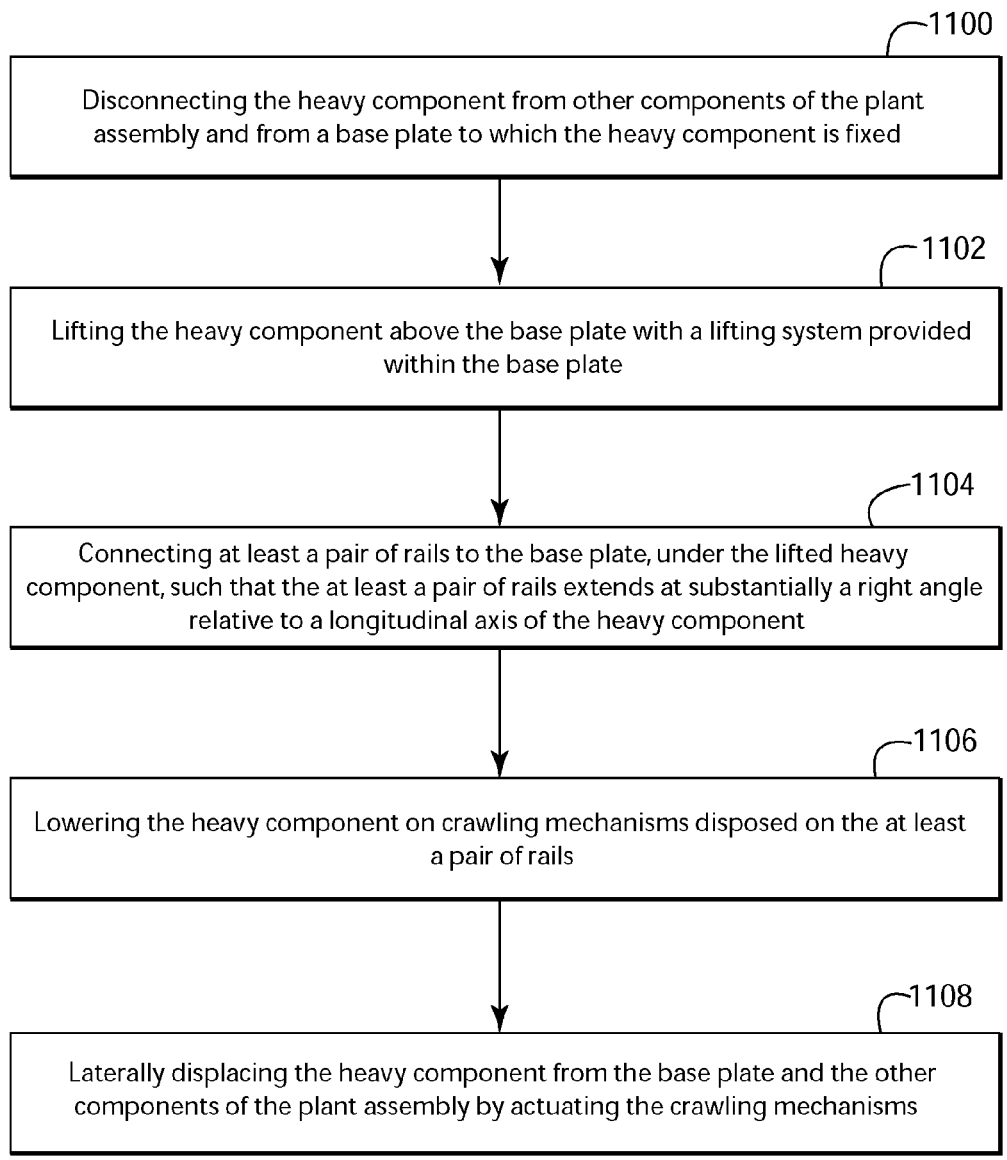
FIG. 11 is a flow chart illustrating steps for laterally replacing a heavy device from a plant assembly according to an exemplary embodiment.

Having discussed the arrangement of the plant assembly and various systems related to the turbine and the generator, the steps of various methods for laterally replacing and aligning the turbine with the generator are discussed next with reference to FIGS. 11 and 12. According to an exemplary embodiment, the steps of a method of laterally replacing a heavy component of a plant assembly are shown in FIG. 11. The method includes a step 1100 of disconnecting the heavy component from other components of the plant assembly and from a base plate to which the heavy component is fixed, a step 1102 of lifting the heavy component above the base plate with a lifting system provided within the base plate, a step 1104 of connecting at least a pair of rails to the base plate, under the lifted heavy component, such that the at least a pair of rails extends at substantially a right angle relative to a longitudinal axis of the heavy component; a step 1106 of lowering the heavy component on crawling mechanisms disposed on the at least a pair of rails, and a step 1108 of laterally replacing the heavy component from the base plate and the other components of the plant assembly by actuating the crawling mechanisms.

Figure 12:
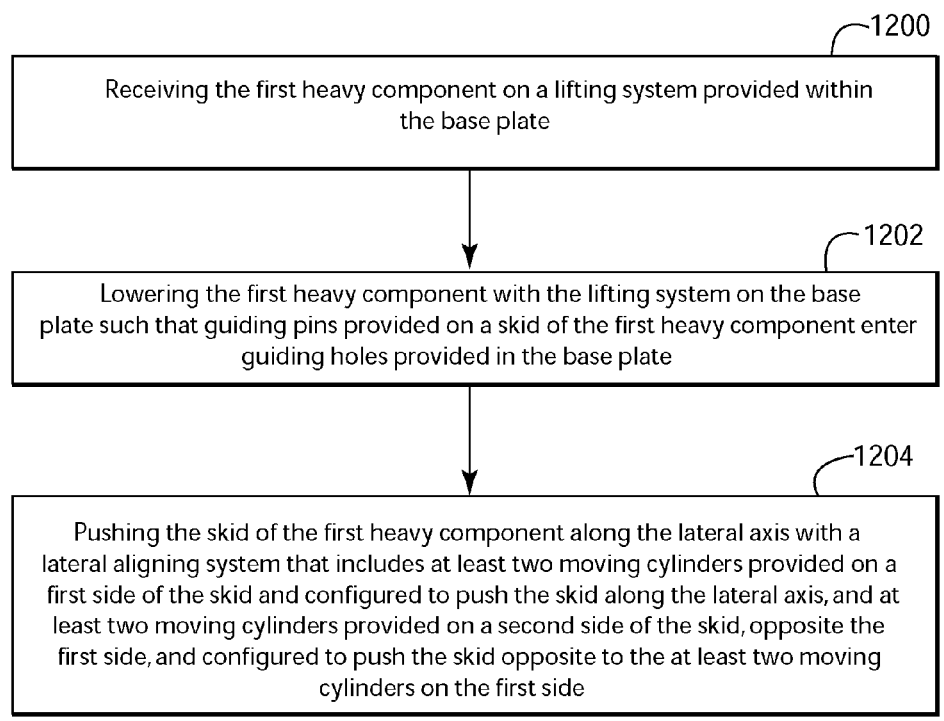
FIG. 12 is a flow chart illustrating steps for laterally aligning the heavy device of FIG. 11 according to an exemplary embodiment.

According to another exemplary embodiment, the steps of a method for laterally aligning a first heavy component with a second component on a base plate of a plant assembly are illustrated in FIG. 12. The first heavy component has a longitudinal axis extending along a longest size of the first heavy component and a lateral axis extending substantially perpendicular to the longitudinal axis such that both the longitudinal axis and the lateral axis are in a plane of the base plate. The method includes a step 1200 of receiving the first heavy component on a lifting system provided within the base plate, a step 1202 of lowering the first heavy component with the lifting system on the base plate such that guiding pins provided on a skid of the first heavy component enter guiding holes provided in the base plate, and a step 1204 of pushing the skid of the first heavy component along the lateral axis with a lateral aligning system that includes at least two moving cylinders provided on a first side of the skid and configured to push the skid along the lateral axis, and at least two moving cylinders provided on a second side of the skid, opposite the first side, and configured to push the skid opposite to the at least two moving cylinders on the first side.

Figure 13:
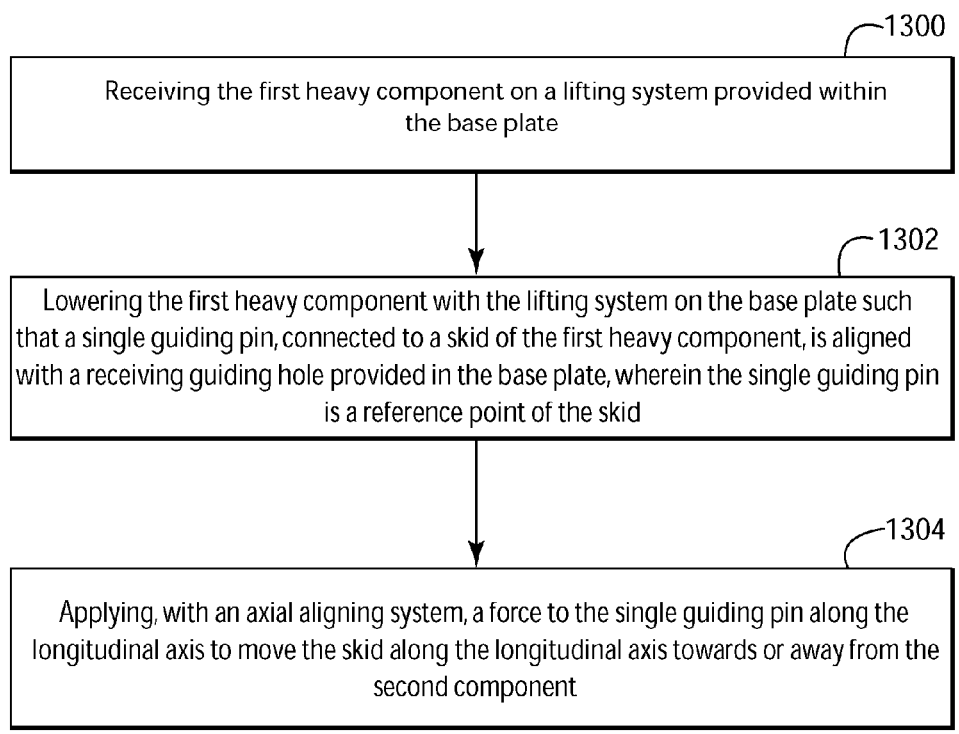
FIG. 13 is a flow chart illustrating steps for axially aligning the heavy device of FIG. 11 according to an exemplary embodiment.

According to an exemplary embodiment, the steps of a method for axially aligning a first heavy component with a second component on a base plate of a plant assembly are illustrated in FIG. 13. The first heavy component has a longitudinal axis extending along a longest size of the first heavy component and a lateral axis extending substantially perpendicular to the longitudinal axis such that both the longitudinal axis and the lateral axis are in a plane of the base plate. The method includes a step 1300 of receiving the first heavy component on a lifting system provided within the base plate, a step 1302 of lowering the first heavy component with the lifting system on the base plate such that a single guiding pin, connected to a skid of the first heavy component, enters a receiving guiding hole provided in the base plate, wherein the single guiding pin is a reference point of the skid, and a step 1306 of applying, with an axial aligning system, a force to the single guiding pin along the longitudinal axis to move the skid along the longitudinal axis towards or away from the second component.

By using the above described methods, a time for having a fully functional plant assembly is reduced from 45 days to around 22 days.

Figure 14:
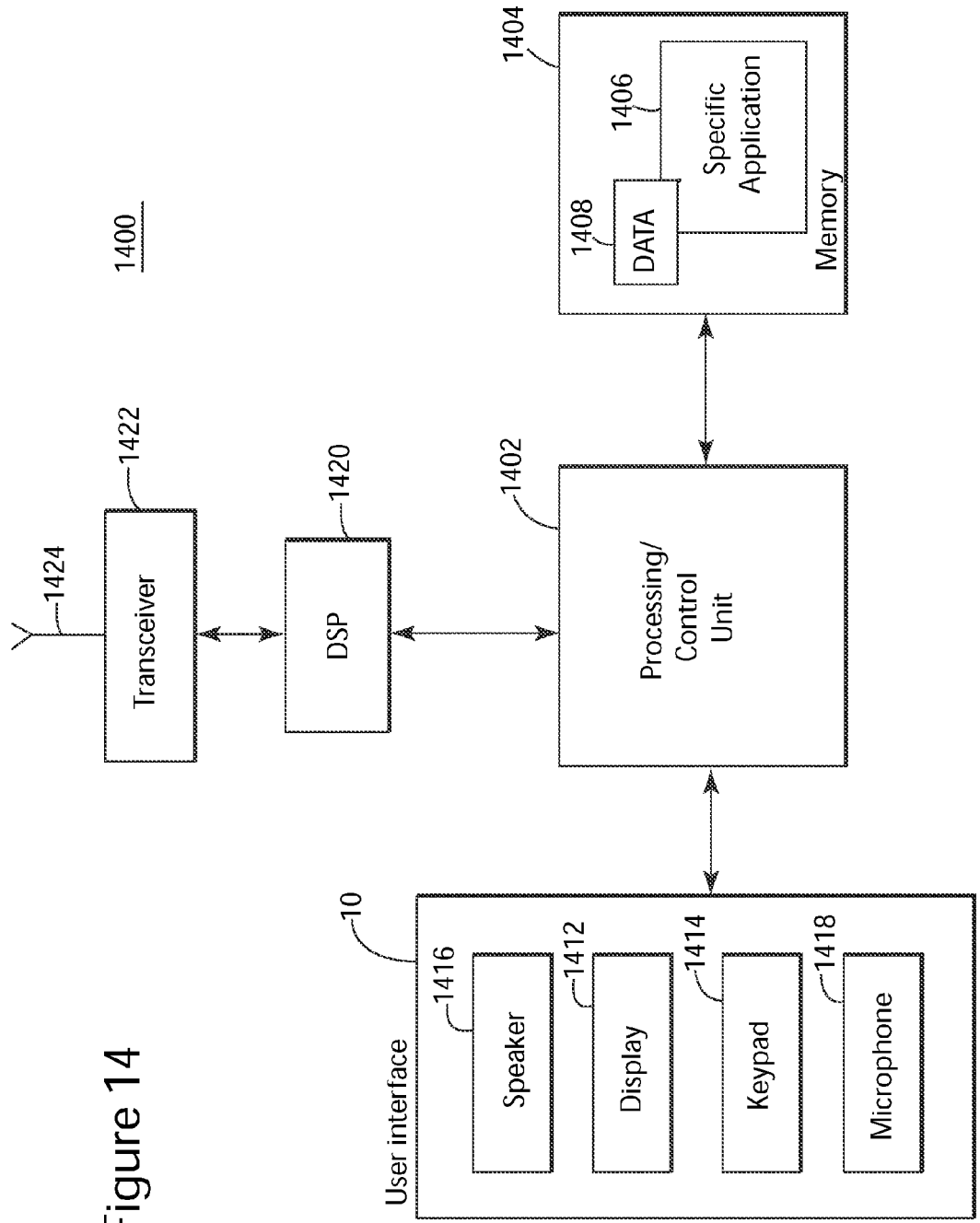
FIG. 14 is a schematic diagram of a computerized system for controlling the replacing and alignment of the heavy device.

The control of each of the lifting system 100, the lateral alignment system 120 and the axial alignment system 130 may be achieved with a computer system or multiple computer systems configured to run executable instructions, which, when executed, actuate the systems 100, 120 and 130 to lift or move the skid 16. Such a computer system is shown in FIG. 14 as system 1400 and may include a processing/ control unit 1402, such as a microprocessor, reduced instruction set computer (RISC), or other central processing module. The processing unit 1402 need not be a single device, and may include one or more processors. For example, the processing unit 1402 may include a master processor and associated slave processors coupled to communicate with the master processor.

The processing unit 1402 may control the basic functions of the system as dictated by programs available in the storage/memory 1404. Thus, the processing unit 1402 may execute the functions described in FIGS. 11 and 12. More particularly, the storage/memory 1404 may include an operating system and program modules for carrying out functions and applications on the computing system. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the parallel computing system 1400 via data signals, such as being downloaded electronically via a network, such as the Internet.

One of the programs that may be stored in the storage/memory 1404 is a specific program 1406. As previously described, the specific program 1406 may determine a height for raising the skid, a distance for moving the skid from position I to position II in FIG. 4, etc. The program 1406 and associated features may be implemented in software and/or firmware operable by way of the processor 1402. The program storage/memory 1404 may also be used to store data 1408, such as the tables 28 and 30, or other data associated with the present exemplary embodiments. In one exemplary embodiment, the programs 1406 and data 1408 are stored in non-volatile electrically-erasable, programmable ROM (EEPROM), flash ROM, etc. so that the information is not lost upon power down of the parallel computing system 1400.

The processor 1402 may also be coupled to user interface 1410 elements associated with a mobile terminal. The user interface 1410 of the mobile terminal may include, for example, a display 1412 such as a liquid crystal display, a keypad 1414, speaker 1416, and a microphone 1418. These and other user interface components are coupled to the processor 1402 as is known in the art. The keypad 1414 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The parallel computing system 1400 may also include a digital signal processor (DSP) 1420. The DSP 1420 may perform a variety of functions, including analog-to-digital (A/D) conversion, digital-to-analog (D/A) conversion, speech coding/decoding, encryption/decryption, error detection and correction, bit stream translation, filtering, etc. The transceiver 1422, generally coupled to an antenna 1424, may transmit and receive the radio signals associated with a wireless device.

The computing system 1400 of FIG. 14 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 1406 and associated features, and data 1408, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The disclosed exemplary embodiments provide a system, computer medium and a method for laterally replacing a heavy device and for aligning the heavy device with another heavy device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A method for laterally replacing a heavy component of a plant assembly, the method comprising:
   disconnecting the heavy component from other components of the plant assembly and from a base plate to which the heavy component is fixed;
   lifting the heavy component above the base plate with a lifting system provided within the base plate;
   connecting at least a pair of removable rails to the base plate, under the lifted heavy component, such that the at least a pair of removable rails extends at substantially a right angle relative to a longitudinal axis of the heavy component;
   connecting the at least a pair of removable rails to a trolley disposed next to the base plate such that the at least a pair of removable rails spans between the base plate and the trolley;
   displacing the heavy component until the heavy component is above the trolley;
   lowering the heavy component on to at least a pair of pads coupled to a crawling mechanism disposed on the at least a pair of removable rails; and
   laterally moving the heavy component from the base plate and the other components of the plant assembly by actuating the crawling mechanism, wherein the at least a pair of pads is in direct contact with the removable rails, and are configured to slide directly on the at least a pair of removable rails.

2. The method of claim 1, further comprising:
lifting the heavy component above the removable rail with another lifting system provided on the trolley;
removing the at least a pair of removable rails from the trolley; and
lowering the heavy component on the trolley.

3. The method of claim 1, wherein the crawling mechanism comprises two active crawling mechanisms and wherein the at least a pair of pads comprises two passive driven pads to the corners of a skid on which the heavy component is placed.

4. The method of claim 1, further comprising:
hydraulically lifting and laterally replacing the heavy component.

5. The method of claim 1, wherein the heavy component is a gas turbine and the base plate is fixed on a barge.

6. The method of claim 5, wherein the gas turbine has a weight between 100 to 250 tons.

* * * * *